United States Patent [19]

Hibino et al.

[11] 4,388,368

[45] Jun. 14, 1983

[54] MAGNETIC RECORDING MEDIA

[75] Inventors: Noburo Hibino; Goro Akashi, both of Odawara, Japan

[73] Assignee: Fuji Photo Film Co., Ltd., Kanagawa, Japan

[21] Appl. No.: 286,840

[22] Filed: Jul. 27, 1981

[30] Foreign Application Priority Data

Jul. 28, 1980 [JP] Japan .............................. 55/103396

[51] Int. Cl.$^3$ ............................................. H01F 10/00
[52] U.S. Cl. .................................. 428/336; 428/415; 428/430; 428/694; 428/900
[58] Field of Search ............... 428/900, 336, 415, 337, 428/423.7, 425.6, 430, 694; 427/127–132, 48

[56] References Cited

U.S. PATENT DOCUMENTS

| | | | |
|---|---|---|---|
| 3,855,051 | 12/1974 | Lania et al. | 428/430 X |
| 4,202,932 | 5/1980 | Chen et al. | 428/900 |
| 4,254,189 | 3/1981 | Fisher | 428/900 |

*Primary Examiner*—Bernard D. Pianalto
*Attorney, Agent, or Firm*—Sughrue, Mion, Zinn, Macpeak & Seas

[57] ABSTRACT

The increased occurrence of jitter, wow, flutter, folding, and tendency to crumple of a magnetic recording medium when reducing the thickness of the support of the magnetic recording medium is effectively prevented by forming a thin glass layer on the base film for the magnetic recording medium.

8 Claims, No Drawings

MAGNETIC RECORDING MEDIA

FIELD OF THE INVENTION

This invention relates to base films for magnetic recording media. More particularly, the invention relates to base films suitable for magnetic recording media such as audio recording tapes, video recording tapes, memory tapes, floppy discs, etc.

BACKGROUND OF THE INVENTION

Supports conventionally used for magnetic recording tapes include polyester films such as polyethylene terephthalate films, polyethylene naphthalate films, etc.; polyolefin films such as polypropylene films, etc.; cellulose derivative films such as cellulose triacetate films, cellulose diacetate films, etc.; films such as polycarbonate films, polyvinyl chloride films, etc.; papers; foils of a non-magnetic metal such as copper, aluminum, zinc, etc.

Among the aforementioned supports, polyolefin films show large expansion and contraction even by a small deviation of tension and show poor jitter characteristics due to the low tensile elasticity. The foils of a non-magnetic metal such as copper, aluminum, zinc, etc., have high tensile elasticity but are liable to be cut and show a weak tear resistance due to a low percentage elongation at break. These films have a fault of readily causing plastic deformation. Cellulose derivative films and paper supports have the fault that the hygroscopic coefficient of expansion is large. Polycarbonate films are poor in organic solvent resistance and polyvinyl chloride films are low in heat resistance.

Polyester films, in particular, polyethylene terephthalate films, have recently been used as supports for magnetic recording tapes, since they have relatively few faults and have balanced characteristics, for example, substantially equal Young's modulus in the lengthwise and transverse directions. More specifically, polyethylene terephthalate films having a thickness of from about 8 to 16 μm are used for home video cassette tapes; e.g., Beta-Format (trademark of Sony Corp.), VHS tape (trademark of Victor Corp. of Japan, Ltd.), etc., and polyethylene terephthalate films having a thickness of from about 4 to 14 μm are used for audio cassette tapes.

It has been proposed to reduce the thickness of a base film for prolonging the recording period of time of a home video tape but if the thickness of the base tape is reduced, the tape is liable to undergo expansion and contraction with the deviation of tension during the running of the tape, which results in jitter undesirable for television images. Also, video tapes using such base tapes having reduced thickness are liable to undergo problems such as crumpling and folding during running of the video tape.

It has also been practiced to reduce the thickness of an audio cassette tape for prolonging the recording time, but as the thickness of the base tape is reduced, the audio recording tape is liable to undergo distortion of sound, i.e., so-called wow and flutter. Such audio tape also shows such undesirable faults as folding of tape at the edge portion thereof, a reduction in smoothness due to the permanent distortion of the edgeportion of the tape, and the occurrence of a large amount of curling.

The deviation in tension of a magnetic recording tape in the lengthwise direction of the tape caused by friction and fluctuation of frictional force during running of the tape causes stretching vibrations, which results in jitter (video tape) and wow and flutter (audio tape). For overcoming this difficulty, it is desirable that the elongation percentage per unit tension (e.g., elongation percentage/100 g load) be kept constant even if the thickness of the support is reduced. That is, even if the thickness of a tape is reduced, the above-mentioned difficulty can be overcome by keeping the Young's modulus of the tape in the lengthwise direction high in inverse proportion to the thickness.

The occurrence of folding and crumpling in the transverse direction depends on the bending strength of the tape in the transverse direction. Since the bending strength is proportional to Young's modulus×(thickness)$^3$ in the transverse direction, if the thickness of the tape is reduced from, for example, 15 μm to 10 μm and the Young's modulus is same, the bending strength is reduced to only 8/27ths of the original bending strength. It has, therefore, been found that for preventing the occurrence of folding and crumpling when the thickness of a tape is reduced, it is necessary to greatly increase the Young's modulus of the tape in the transverse direction.

Therefore, for overcoming the aforesaid difficulties in case of reducing the thickness of a base tape for magnetic recording tape, it is necessary to increase both the Young's modulus in the lengthwise direction and the Young's modulus in the transverse direction.

SUMMARY OF THE INVENTION

As the result of investigations on various base materials, it has now been found that the occurrence of jitter, wow, flutter, folding and crumpling of a magnetic recording tape using a plastic film as the support can be effectively prevented by applying a thin glass layer onto at least one surface of the plastic film.

Thus, according to this invention, there is provided a base film for magnetic recording medium comprising a plastic film having a thin glass layer laminated on at least one surface thereof.

DETAILED DESCRIPTION OF THE INVENTION

In the magnetic recording medium according to the present invention, a thin glass film can be laminated on one surface of the plastic film, either the back surface or the front surface onto which the magnetic layer is to be applied, preferably on the back surface, or can be laminated on both surfaces of the plastic film. In the base film in which the thin glass film is provided on the front surface, a subbing layer can be provided between the glass film and the magnetic layer to improve the adhesion of the magnetic layer to the base film, or a magnetic metal layer can be provided on the thin glass film by the vapor deposition method.

The thickness of each thin glass film layer can be in the range of about 0.1 to 5 μm, preferably 0.5 to 3 μm. If the thickness of glass film is below about 0.1 μm, the improvement in jitter characteristics of the resulting magnetic recording medium would be low and, if the thickness exceeds about 5 μm, the resulting magnetic recording medium would be liable to break.

A thin glass film which is laminated on the surface of a plastic film may be prepared in several manners.

For example, in a typical embodiment, a molten glass, e.g., soda lime silica glass ($Na_2O \cdot CaO \cdot SiO_2 = 15:13:72$ by weight) molten at about 1,550° C., is drawn and rolled and then the glass sheet thus-formed is supported by clips at both ends and heated at about 850° C. Thereafter, the glass sheet is stretched to from 1.05 to 10 times the area of the original sheet while blowing hot blast of air at a temperature lower than the aforesaid heating temperature onto the glass sheet, e.g., about 700° C. By stretching the glass sheet while blowing thereon a hot blast of air at a temperature lower than the heating temperature, the glass sheet is cooled faster at thin portions, and thereby the thickness of the glass sheet thus-stretched is maintained uniform.

A thin glass film may also be prepared by a so-called inflation method in which molten glass is extruded through an annular slit and then the extruded glass is stretched by introducing compressed air within the extruded glass. This method uses the same principle as off-hand blowing.

The base film of this invention is obtained by, for example, coating an adhesive on the thin glass film, applying the glass film onto a plastic film, and heating while pressing the assembled layers.

Examples of the glass for the thin glass layer include soda lime silica glass, lime glass, borosilicate glass, high-silica glass, etc., and the glass may be colored by adding thereto a metal oxide. Furthermore, for imparting suitable antislipping property or adhesive property, embossing may be applied to the surface of the glass film or fine particles of a high-melting material may be incorporated in the glass film.

As adhesive suitable for the lamination, copolyester, epoxy resin, polyurethane resin, etc., can be used.

Also, various plastic films such as, for example, polyethylene terephthalate films, cellophane films, polycarbonate films, etc., may be used but plastic films having a tear strength of higher than about 10 kg/mm² are particularly preferred. A preferred plastic film is a polyethylene terephthalate film.

On the base film of this invention there is then formed a recording layer, such as a conventionally known magnetic layer. Compositions of such recording layers and coating methods are described in, for example, U.S. Pat. No. 4,135,016 and these layers and coating methods can be applied to the base films of this invention.

The invention is explained in more detail by the following example.

EXAMPLE

A magnetic liquid coating composition was prepared by kneading a mixture of the components shown below, dispersing the mixture in a ball mill for 24 hours, adding thereto 7 parts by weight of a polyisocyanate (adduct of 3 mols of tolylene diisocyanate and 1 mol of trimethylolpropane in a 75 wt% ethyl acetate solution with NCO content of about 13.3 wt%, sold as "Desmodur" (trademark) by Bayer A. G.), dispersing the mixture for 1 additional hour at a high shear rate, and filtering the dispersion by means of a filter having a mean perforation diameter of 2 μ. The viscosity of the liquid coating composition was 35 c.p.

|  | parts by weight |
|---|---|
| Maghemite ($\gamma$-Fe$_2$O$_3$)* | 100 |
| Polyester polyurethane** | 7 |
| Vinyl chloride/vinyl acetate copolymer*** | 12 |
| Soybean lecithin | 2 |
| Silicone oil | 1 |
| Aluminum oxide ($\alpha$-Al$_2$O$_3$, mean particle size of 0.2μ) | 2 |
| Butyl acetate | 120 |
| Methyl isobutyl ketone | 80 |

*Gamma iron oxide having an average length of 0.52μ, an acicular ratio of 9:1, and a saturation magnetization of 347 emu/cm³.
**Product prepared by urethanating a polyester synthesized from adipic acid, terephthalic acid, and ethylene glycol, diethylene glycol, butylene glycol or the like using 4,4'-diphenylmethane diisocyanate, etc., with a styrene-corresponding mean molecular weight of about 13,000, sold as "Pantex T-5205" (trademark) by Nippon Reichhole Co.).
***Copolymerization ratio of 83/17 (by mol percent), polymerization degree of about 450.

The magnetic liquid coating composition thus prepared was continuously coated on each of the films of 300 mm in width shown in Table 1 continuously moving at a speed of 180 m/min by doctor coating. Each of the laminated films (Tape Nos. 2 to 5 in Table 1) was prepared by drawing and rolling a soda lime silica glass (Na$_2$O.CaO.SiO$_2$=15:13:72 by weight) molten at about 1,550° C., stretching the glass sheet at about 850° C. while blowing hot blast of air at about 700° C., dissolving a solvent-soluble polyester adhesive in a solvent, coating the solution on the resulting thin glass film at a thickness of 0.1μ(dry thickness), applying the glass film onto the plastic film and passing the laminate through a press roller under heating.

After drying the coated layer, the film was subjected to a super calender treatment by means of a calender roll composed of a polyamide roll as an elastic roll and a chrome-plated iron roll as a metal roll to smooth the surface of the magnetic layer formed.

The film having the magnetic layer thus formed was cut in the lengthwise direction in a width of ½ inch to provide a video tape.

The characteristics of four kinds of the video tapes thus obtained were determined using a VTR (video tape recorder), "AV-8700" (made by Sony Corp.) and the results are shown in Table 1 together with the properties of the films used.

TABLE 1

| Video Tape No. | Kind of Film | Young's Modulus of Film MD[1] (kg/mm²) | Young's Modulus of Film TD[2] (kg/mm²) | Tear Strength MD[1] (kg/mm²) | Thicknesses dmg (μ) | Thicknesses dbase (μ) | Thicknesses dglass (μ) | Jitter[3] Relative Value | (A)[4] | (B)[5] |
|---|---|---|---|---|---|---|---|---|---|---|
| 1 (control) | PET (polyethylene) terephthalate) (tensilized type) | 800 | 400 | 40 | 4.5 | 9.5 | 0 | 1 | 40/100 | 0/100 |
| 2 | PET (tensilized type) | 800 | 400 | 40 | 4.5 | 6.5 | 3 | 0.7 | 0/100 | 0/100 |
| 3 | PET (balanced type) | 500 | 500 | 27 | 4.5 | 6.5 | 3 | 0.8 | 1/100 | 1/100 |
| 4 | Cellophane | 150 | 130 | 8.0 | 4.5 | 6.5 | 3 | 1 | 3/100 | 40/100 |

TABLE 1-continued

| Video Tape No. | Kind of Film | Young's Modulus of Film | | Tear Strength | Thicknesses | | | Jitter[3] | (A)[4] | (B)[5] |
| --- | --- | --- | --- | --- | --- | --- | --- | --- | --- | --- |
| | | MD[1] (kg/mm$^2$) | TD[2] (kg/mm$^2$) | MD[1] (kg/mm$^2$) | dmg ($\mu$) | dbase ($\mu$) | dglass ($\mu$) | Relative Value | | |
| 5 | Polycarbonate | 240 | 220 | 7.0 | 4.5 | 6.5 | 3 | 0.9 | 2/100 | 31/100 |

[1]MD: Machine direction of film
[2]TD: Transverse direction of film
[3]The control video tape No. 1 was assigned an arbitrary value of 1.0 for evaluating the jitter of other tapes.
[4](A): Ratio of occurrence of folding and crumpling.
[5](B): Breakage ratio of tape.

While the invention has been described in detail and with reference to specific embodiments thereof, it will be apparent to one skilled in the art that various changes and modifications can be made therein without departing from the spirit and scope thereof.

What is claimed is:

1. In a magnetic recording tape comprising a base film having coated thereon a magnetic recording layer, the improvement wherein said base film comprises a plastic film having a thin glass layer laminated on at least one surface thereof, wherein the thickness of the glass layer is about 0.1 to about 5 μm.

2. A base film for a magnetic recording medium as in claim 1, wherein the glass layer is adhered to the plastic film using an adhesive.

3. A base film for a magnetic recording medium as in claim 1, wherein said magnetic recording medium is a magnetic video recording tape.

4. A base film for a magnetic recording medium as in claim 1 or 2, wherein the plastic film has a tear strength of more than about 10 kg/mm$^2$.

5. A base film for a magnetic recording medium as in claim 1 or 2, wherein the plastic film is a polyethylene terephthalate film.

6. A base film for a magnetic recording medium as in claim 1 or 2, wherein the glass layer is formed from lime glass, soda lime glass, borosilicate glass, or high-silica glass.

7. A base film for a magnetic recording medium as in claim 1, wherein the thickness of the glass layer is 0.5 to 3 μm.

8. A base film for a magnetic recording medium as in claim 1, wherein the thin glass layer is homogeneous.

* * * * *